UNITED STATES PATENT OFFICE.

MAX BAZLEN, EMIL RIEGER, AND THEODOR WOHLFAHRT, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

CRYSTALLINE MONOZINC FORMALDEHYDE SULFOXYLATE.

1,063,004.

Specification of Letters Patent. Patented May 27, 1913.

No Drawing. Application filed February 20, 1912. Serial No. 678,865.

*To all whom it may concern:*

B it known that we, MAX BAZLEN, EMIL RIEGER, and THEODOR WOHLFAHRT, subjects, respectively, the first and third of the King of Wurttemberg and the second of the King of Prussia, residing at Ludwigshafen-on-the-Rhine, Germany, have invented new and useful Improvements in Crystalline Monozinc Formaldehyde Sulfoxylate, of which the following is a specification.

It is known that the di-zinc salt of formaldehyde sulfoxylic acid (of a constitution corresponding to the formula $ZnSO_2.CH_2O$) can be obtained in the solid state both in the anhydrous form and also containing water of crystallization (see *Berichte*, 1909, vol. 42, p. 4637). It is placed on the market in the form of a difficultly soluble powder under the name of "decroline." By evaporating a solution of the mono-zinc salt of formaldehyde sulfoxylic acid, either alone, or in admixture with another salt, thick syrups have been obtained which, in some cases, on cooling, set to a hard glassy mass.

We have found that mono-zinc formaldehyde sulfoxylate can be obtained in the crystalline form from a solution thereof, if such solution be evaporated, preferably under reduced pressure at the temperature of the boiling water bath, and care be taken when the solution has reached the point of saturation it is brought into contact with a crystal of mono-zinc formaldehyde sulfoxylate. Such crystals can be produced initially by stirring a very concentrated solution of zinc formaldehyde hydrosulfite with alcohol, whereupon mono-zinc formaldehyde sulfoxylate is precipitated in crystalline form, while zinc formaldehyde-bisulfite remains in solution. When once the manufacture has been started, the crystals floating in the air, or from different parts of the apparatus are often sufficient to initiate the formation of the crystals in a solution of sufficient concentration, provided they are allowed to come into contact with such solution. When the separation of the crystals of mono-zinc formaldehyde sulfoxylate has commenced, it is preferred to continue the evaporation until it is found that no considerable increase in the quantity of crystals takes place. The crystals are then separated, which may be done either by filtration or by centrifugal action, and the said crystals are preferably washed with alcohol and dried *in vacuo*.

The crystals of mono-zinc formaldehyde sulfoxylate are thus produced free from water of crystallization and have a constitution corresponding to the formula $Zn(HSO_2.CH_2O)_2$ and have, when dry, excellent keeping power. They are practically insoluble in alcohol. If a solution in water at 20° C. be prepared containing about 70 parts of the salt to 100 parts of water, on allowing this solution to stand a large quantity of small rhombohedral crystals separates out, these having a constitution corresponding to the formula

$$Zn(HSO_2.CH_2O)_2+4H_2O,$$

while if 100 parts of the anhydrous salt be dissolved in 100 parts of water at 60° C., a salt containing three molecular proportions of water of crystallization crystallizes out in pearly leaflets. Neither of the forms containing water of crystallization is, however, so stable as is the anhydrous form.

In carrying out our invention, either pure solutions of the mono-zinc salt, or solutions which contain other salt or salts in addition to the said mono-zinc salt can be employed. One simple method of carrying out our invention consists in evaporating a solution of the easily available zinc formaldehyde hydrosulfite, so that mono-zinc formaldehyde sulfoxylate is obtained in the crystalline form, while zinc formaldehyde bisulfite remains in the mother liquor and can be employed for any required purpose. Another method of carrying out our invention consists in employing solutions prepared by dissolving the di-zinc salt in water with the aid of the requisite quantity of acid to give rise to the mono-zinc salt. Or the mono-sodium formaldehyde sulfoxylate can be treated with a zinc salt in aqueous solution, and then, upon evaporation, if zinc sulfate has been employed, sodium sulfate first separates out and can be removed, or if zinc chlorid has been used the sodium chlorid remains in solution while, in either case, the mono-zinc formaldehyde sulfoxylate is obtained in the crystalline form.

Mono-zinc formaldehyde sulfoxylate, on account of its solubility, can be employed with advantage in many cases where the use of the di-zinc salt is not so advantageous.

Our new compound is capable of reducing 262 grams of indigo for every 32 grams of sulfur contained therein.

Now what we claim is:—

Crystalline mono-zinc formaldehyde sulfoxylate which in the pure state and free from water of crystallization possesses a composition corresponding to the formula $$Zn(HSO_2.CH_2O)_2.$$

In testimony whereof we have hereunto set our hands in the presence of two subscribing witnesses.

MAX BAZLEN.
EMIL RIEGER.
THEODOR WOHLFAHRT.

Witnesses:
J. ALEC. LLOYD,
A. O. TITTMANN.